United States Patent [19]
Protasov et al.

[11] Patent Number: 5,871,117
[45] Date of Patent: *Feb. 16, 1999

[54] TUBULAR LOAD-BEARING COMPOSITE STRUCTURE

[75] Inventors: Viktor Dmitrievich Protasov, Moscow; Vladimir Ivanovich Smyslov, Khotkovo; Mikhail Sergeevich Artjukhov, Khotkovo; Alexandr Ivanovich Davydov, Khotkovo; Eduard Borisovich Medvedev, Khotkovo; Nikolai Grigorievich Moroz, Khotkovo; Evgeny Alexeevich Burdin, Khotkovo; Boris Gavrilovich Maiorov, Khotkovo, all of Russian Federation

[73] Assignees: McDonnell Douglas Corporation, Huntington Beach, Calif.; Crismb-Cat, Moscow, Russian Federation

[*] Notice: This patent issued on a continued prosecution application filed under 37 CFR 1.53(d), and is subject to the twenty year patent term provisions of 35 U.S.C. 154(a)(2).

[21] Appl. No.: 697,090

[22] Filed: Aug. 19, 1996

[51] Int. Cl.⁶ .................................................. B65D 1/16
[52] U.S. Cl. ................................... 220/592; 220/646
[58] Field of Search ...................... 220/592, 589, 220/588, 453, 581, 645, 646, 669, 675

[56] References Cited

U.S. PATENT DOCUMENTS

| | | |
|---|---|---|
| 3,047,191 | 7/1962 | Young ................................. 220/588 |
| 3,083,864 | 4/1963 | Young . |
| 3,228,549 | 1/1966 | Courtney ........................... 220/589 |
| 4,053,081 | 10/1977 | Minke ................................. 220/589 |
| 4,118,262 | 10/1978 | Abbott ........................... 220/588 X |
| 4,137,354 | 1/1979 | Mayes . |
| 4,284,679 | 8/1981 | Blad . |
| 4,717,035 | 1/1988 | Dirkin et al. ...................... 220/589 |
| 4,905,856 | 3/1990 | Krogager .......................... 220/588 |
| 5,211,306 | 5/1993 | Delonge-Immik et al. ........ 220/588 |
| 5,385,262 | 1/1995 | Coquet et al. ................ 220/588 X |
| 5,441,584 | 8/1995 | Mathieu et al. .............. 220/589 X |
| 5,499,739 | 3/1996 | Greist, III et al. ................ 220/589 |

*Primary Examiner*—Steven Pollard
*Attorney, Agent, or Firm*—Bell Seltzer Intellectual Property Law Group of Alston & Bird LLP

[57] ABSTRACT

The invention relates to machine-building. More specifically, it pertains to shell fabrication of airframe parts, which are used in aerospace equipment operating under compound stress. The invention also covers methods and apparatus for the fabrication of the shell structures.

The invention aims to improve wall rigidity and strength.

A tubular pressure vessel in the form of a composite cylindrical body incorporates a lattice-type frame 1 and external protective cover 2; the grid frame is made by winding a layered system 3 of helical 4, longitudinal 5, girth 6, and oblique transition strips 14 linking the girth strips 6; the pattern forms interleaved stiffening ribs 8, 9, 10, 15. The winding is applied to the mandrel, the core 17 is covered with thermostabilized flexible plates 19 with a web of grooves 23, 24, 25, 26 for imbedding a matching pattern of strips 6,4,5, and 14.

4 Claims, 3 Drawing Sheets

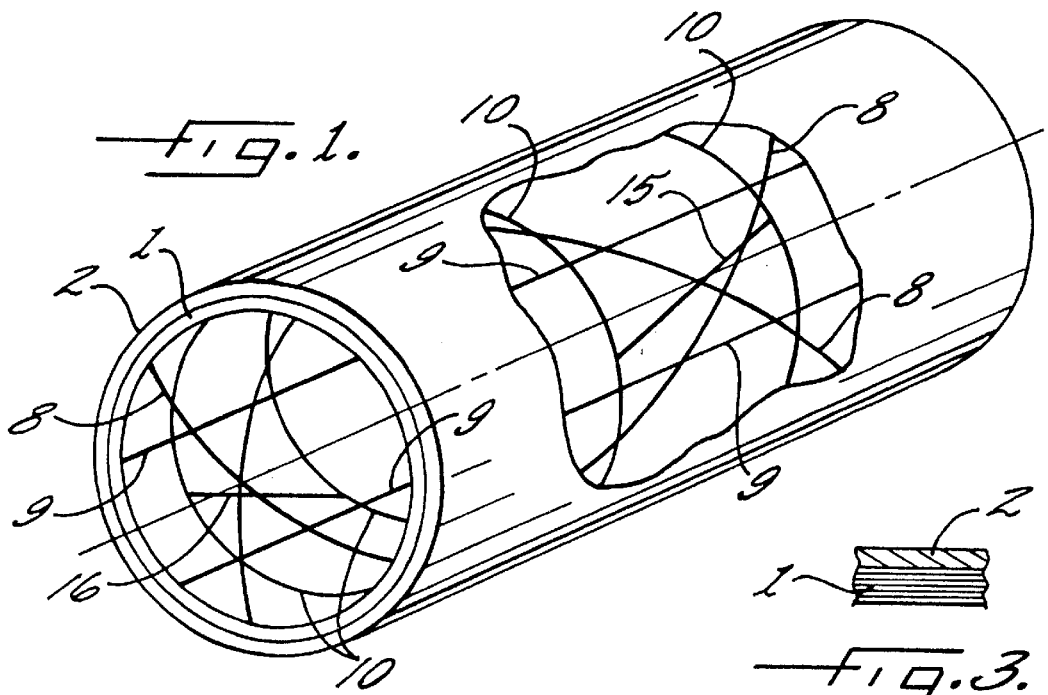
fig.1.
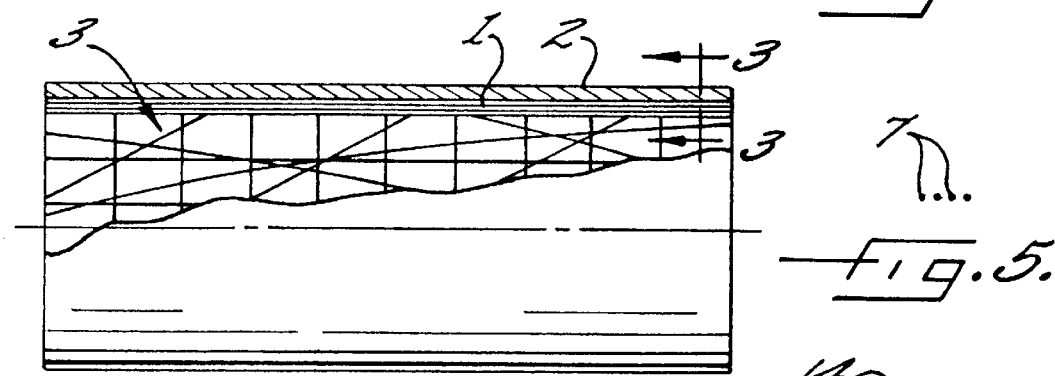
fig.2.
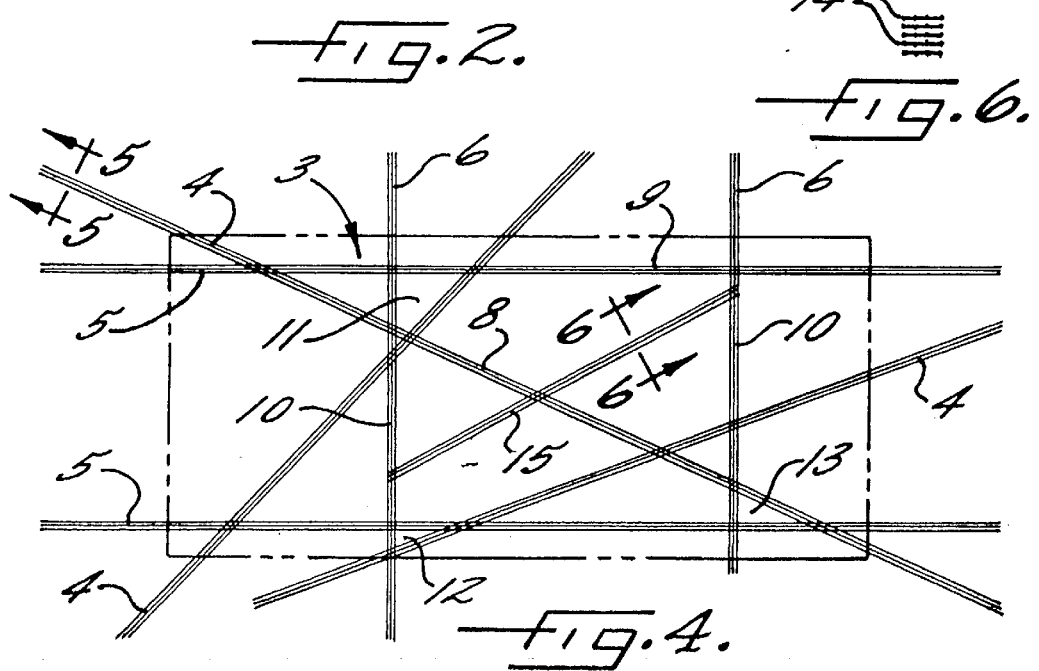
fig.4.
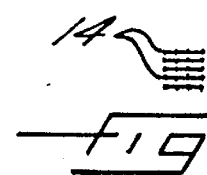
fig.3.
fig.5.
fig.6.

TUBULAR LOAD-BEARING COMPOSITE STRUCTURE

The invention relates in general to machine-building and more particularly to shell construction of airframe parts used in aerospace equipment operating under compound stress. The invention also covers a process and apparatus for their fabrication.

One known method is a tubular member in the form of a composite cylindrical body which consists of a shell and a lattice-type grid formed by the interlaced helical, and girth strips (U.S. Pat. No. 3,083,864, cl. 220–83, 1963).

Another known technology is a composite tubular member in the form of a cylindrical body which consists of lattice-type grid formed by the intersecting unidirectional filaments and an external protective cover (U.S. Pat. No. 4,137,354, cl. 428–116, 1979).

The primary disadvantage of these prior methods of fabrication is reduced strength and rigidity since the tubular pressure vessels are subject to local instability. Also, increased load at the nodes shared by the intersecting helical, longitudinal, and ring-shaped strips which contain triple the amount of reinforcing material detracts from the solidity of the boundaries of the cells.

To ensure proper performance under compound stress with simultaneous compression, torsion, and bending stress, these tubular vessels are reinforced, which makes them excessively heavy.

In terms of the basic technological features, the method most similar to the invention is a composite pressure vessel in the form of a cylindrical body and made of lattice-type grid; the grid represents a layered sequence of interlaced helical, longitudinal, and girth strips imbedded in the shell. The strips are made of unidirectional filaments which form stiffening ribs between the nodes formed by their intersections; they also form a protective covering (U.S. Pat. No. 4,284,679, cl. 428–218, 1978). This tubular vessel, chosen as the prototype, also suffers from the aforementioned disadvantages.

Another known technology for the fabrication of lattice-type tubular vessels made of composites incorporates intersecting helical and girth windings of unidirectional binder-impregnated filaments (U.S. Pat. No. 3,083,864, cl. 220–83, 1962).

Another known technology for the fabrication of lattice-type tubular vessels made of composites is based on the following process: molding blocks are placed on a mandrel; these elements are composed of rubber-like material; a web of intersecting grooves is formed between these blocks and subsequently imbedded with intersecting unidirectional filaments impregnated with a resin, thus forming stiffening ribs; strips under tension protrude over the nodal elements and filaments in the grooves to form a protective covering, which is heat treated; the next step is the removal of the mandrel and the molding blocks (U.S. Pat. No. 4,13,7354, cl. 428–110, 1977).

The known technologies for the fabrication of tubular vessels with lattice-type shell structure fail to ensure adequate quality, especially the solidity of the edges of the cells, which results in unstable performance of the final product.

While it provides better quality, the method based on U.S. Pat. No. 4,137,354 is technologically complex because it involves numerous auxiliary operations to assemble and disassemble the special tooling.

The method which comes closest to the present invention is a composite tubular vessel of lattice-type structure; the method includes covering the mandrel with rubber-like material with a web of intersecting grooves; the grooves are imbedded with intersecting helical, longitudinal, and girth strips of unidirectional binder-impregnated filaments which form stiffening ribs. The strips are covered with molding blocks and heat treated. Then, the mandrel and the rubber-like material are removed (U.S. Pat. No. 4,284,679, cl. 428–218, 1978). This method is chosen as the prototype. One of the disadvantages of the embodiment described is that the build-up at the nodes where the filaments intersect exceeds the elevation of the ribs due to their non-uniform pressing by the molding blocks. Ultimately, this tends to lower the quality of the final product.

Another known mandrel device for the fabrication of composite tubular vessels has a matrix with molding blocks consisting of rubber-like material having a web of intersecting grooves between the blocks. Grooves are imbedded with intersecting unidirectional resin-impregnated fibers which form stiffening ribs (U.S. Pat. No. 4,137,354, cl. 428–116, 1977). The above mandrel is difficult to assemble and disassemble and its fabrication is costly and complex.

The mandrel most similar to the invention in terms of technical features is based on U.S. Pat. No. 4,284,679, cl. 428–218, 1978. It is designed for the fabrication of tubular shells of lattice-type structure made from composites. It contains a core which is covered with rubber-like material having a web of grooves; the grooves are imbedded with intersecting helical, longitudinal, and girth strips of unidirectional fibers which are impregnated with a binder in order to form stiffening ribs of the frame of the shell. The product also suffers from the aforementioned disadvantages.

The object of the invention is to provide a load-bearing tubular structure made of composites in the form of a cylindrical body. Another object is to provide a process and a mandrel device for the fabrication of said structure, which would feature reliable performance under compound stress with simultaneous stress of compression, torsion, and bending. The invention also aims to develop a tubular structure of the smallest possible mass.

Possible benefits of the embodiment of the invention: greater strength and rigidity of the construction owing to a special pattern of the imbedded strips and a special configuration of the mandrel covering.

Method employed to achieve the specified objectives: the composite tubular structure in the form of a cylindrical body comprises a grid frame of lattice-type structure. This structure is a layered system of intersecting helical, longitudinal, and girth strips of unidirectional fibers, which form stiffening ribs between the nodes of intersection, and an external protective covering. The layers comprising the system of girth strips contain oblique transitions (strips) between them which form additional stiffening ribs layered axially within the shell. These stiffening ribs intersect the ribs formed by the helical, longitudinal, and girth strips. Moreover, the additional oblique stiffening ribs situated in the spaces between the girth ribs comprised of girth strips are positioned continuously in a helical pattern; alternatively, they are applied in the local area along the generatrix of the tubular shell spaced by the width of each additional oblique stiffening rib; alternatively, they are evenly spaced relative to each other in the girth direction.

Fabrication of the composite tubular structure of lattice-type structure. The method incorporates covering the mandrel with a rubber-like material with intersecting grooves. The grooves are imbedded with intersecting helical, longitudinal, and girth strips of unidirectional fibers. The fibers are impregnated with a binder in order to form stiffening ribs, upon which molding blocks are applied and heat treatment applied. Then, the core and the rubber-like material are removed; prior to mandrel application, the rubber-like material is subjected to thermostabilization, which produces flexible flat plates cast upon flat expansion-resistant molds made of polyurethane. The working surface of these molds is complementary (mirror image) to the surface of the plates. The plates are secured to the core along the grooves for the girth strips with bands made of unidirectional filaments of fibrous material.

The mandrel for the fabrication of the tubular structure of cylindrical shape. The tubular structure or shell has a lattice-type structure made of composites and containing a core and a rubber-like material applied to it. This material features intersecting grooves, which are imbedded with intersecting helical, longitudinal, and girth strips of unidirectional fibers forming stiffening ribs of the grid. The rubber-like material applied to the core is made of flexible thermostabilized flat plates mounted upon the core by a system of radiating positioning rods and bands made of unidirectional filaments of fibrous material, which are positioned in the grooves for the girth strips.

The tubular structure features the following novel characteristics:

the layers comprising the system of girth strips have integral oblique webs between them, which are integrated with the aforementioned layers;

together they form additional stiffening ribs layered in axial orientation within the shell wall;

these stiffening ribs intersect the ribs formed by helical, longitudinal, and girth strips;

Moreover, additional stiffening ribs, formed in the spaces between the girth ribs defined by the girth strips, are positioned so as to form a continuous helical pattern;

these additional stiffening ribs are formed in the local area along the generatrix of the shell spaced by the width of each additional oblique stiffening rib;

these additional stiffening ribs are evenly spaced relative to each other in the girth direction.

The technology for fabricating the composite tubular structure of lattice-type structure features the following novel and significant characteristics:

thermostabilization of the rubber-like material prior to core application;

after it is cast in flat dimensionally-stable molds;

shaped in the form of flexible flat plates, composed of polyurethane;

with working surface being complementary to the surface relief of the plate;

applying the described plates to the core, along the grooves for the girth strips using bands made of unidirectional filaments of fibrous material.

The mandrel for fabricating the composite tubular structure of lattice-type structure features the following significant and novel characteristics:

the rubber-like material applied to the mandrel is made of flexible flat plates;

applied to the core by means of radiating positioning rods, and bands, made of unidirectional filaments of fibrous material, and positioned in the grooves for the girth strips.

The features described above are essential characteristics. Individually and in combination they are aimed at improving certain properties stipulated in the statement of the embodiment and objectives pursued by the invention. The desired results cannot be attained if any one feature is missing. For example, the object of the invention would not be attained if the oblique transitions incorporated into the layers comprising the system of girth strips which form additional stiffening ribs are eliminated; similarly, if the rubber-like material molding the stiffening ribs of the plates is not thermostabilized; similarly, if the rubber-like material applied to the core is not executed in the form of flexible flat thermostabilized plates.

The novel and significant features of the invention have not been discovered in any known embodiments, analogous devices, or prototypes. Consequently, the proposed technical solutions can be characterized as "innovations".

When integrated, the already known and the proposed features offer an improved solution to the problem of fabrication of tubular structure made of composites, better performance under compound stress with simultaneous bending, compression, and torsion stress. As a result, the proposed technical solutions can be described as significantly different from the existing technologies and prototypes. The invention is the result of creative contribution and experimental research. It presently lacks the detailed documentation and standard specifications; it thus meets the "stage of invention" criteria.

Key features of the invention are illustrated in the drawings.

FIG. 1 is a perspective view of the composite tubular structure with the skin partially removed to reveal the grid;

FIG. 2 presents a cross-section of the shell;

FIG. 3 is a cross-sectional view taken on line 3—3 of FIG.2;

FIG. 4 depicts additional stiffening ribs connecting the girth ribs;

FIG. 5 is a cross-sectional view taken on line 5—5 of FIG. 4;

FIG. 6 is a cross-sectional view taken on line 6—6 of FIG. 4;

Figure 7:
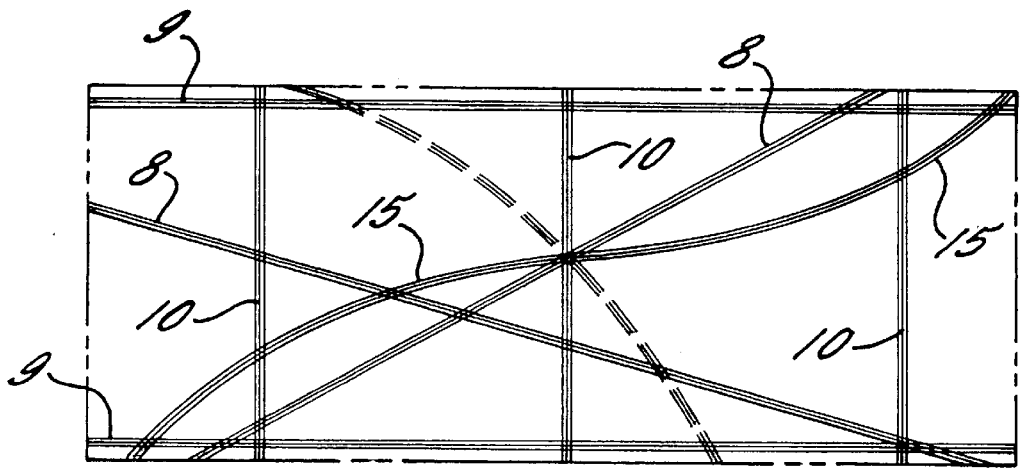
FIG. 7 depicts the location of additional ribs positioned in a helical pattern.

A composite tubular structure in the form of a cylindrical body includes a lattice-type structural grid 1 and an external protective cover 2; the structural grid 1 is a layered system 3 of intersecting helical, longitudinal, and girth strips 4,5,6 layered in the interior of the pipe shell; these strips are constructed of unidirectional filaments 7, (FIG. 5), which form stiffening ribs 8,9,10 between the nodes of intersections 11,12,13. The layers 3 of girth strips 6 feature integrated oblique transitions 14 between them, which form in the grid 1 additional layered oblique stiffening ribs 15, which intersect stiffening ribs 8,9,10 formed by the intersecting helical, longitudinal, and girth strips 4,5,6.

Figure 8:
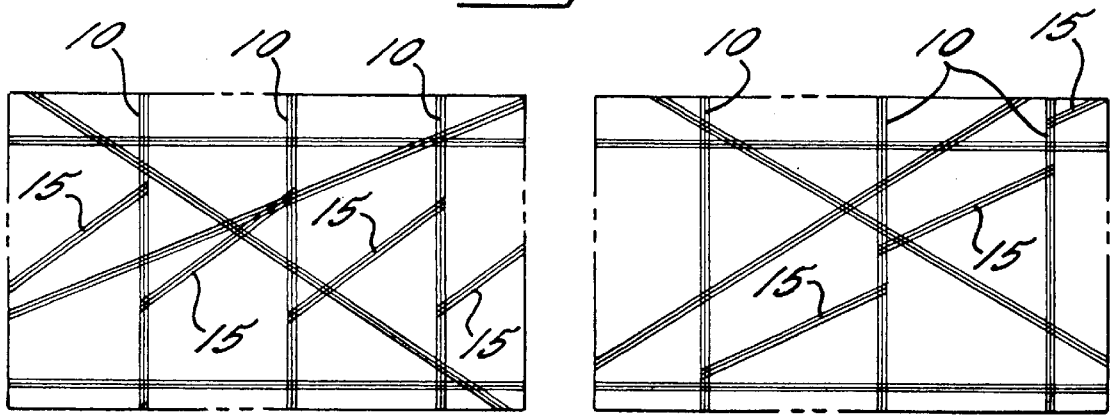
FIG. 8 depicts the position of additional ribs in the local area along the generatrix of the tubular shell.
Figure 9:
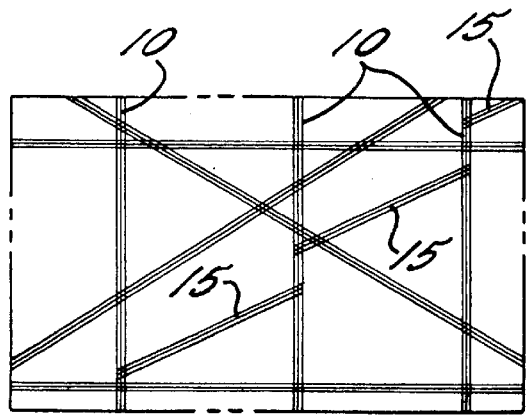
FIG. 9 shows the position of additional ribs evenly spaced relative to each other.

FIG. 1 shows a tubular load-bearing structure with two girth ribs 10, intersecting helical and longitudinal ribs 8, 9, which intersect additional stiffening ribs 15 in one direction in a front view and 16 in the opposite direction in a rear view. If more girth stiffening ribs 10 are required, the additional stiffening ribs 15 in adjacent spaces between them can be wound to form a continuous helical pattern (FIG. 7); or, alternatively, they can be positioned in the local zone along the generatrix of the wall (FIG. 8), or evenly spaced relative to each other (FIG. 9) in the girth direction. This allows the manufacturer to control the rigidity of the tubular structure depending on the maximum load specifications and weight and ensures the required performance and strength.

Figure 10:
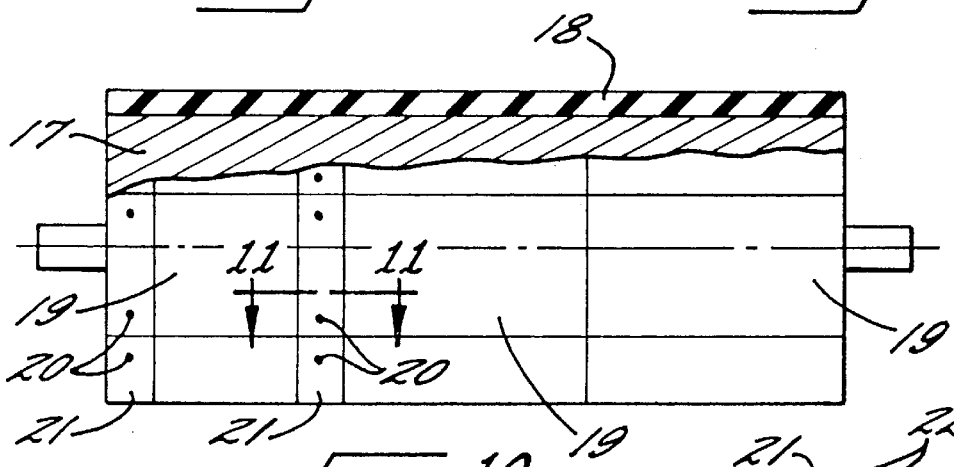
FIG. 10 is the mandrel for the fabrication of the tubular structure.
Figure 11:
FIG. 11 is a cross-sectional view taken on line 11—11 of FIG. 10.
Figure 12:
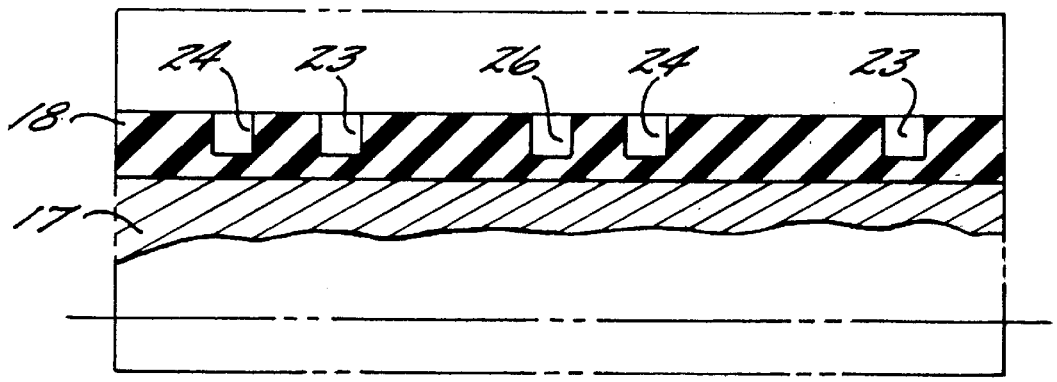
FIG. 12 is a enlarged segment of the mandrel.
Figure 13:
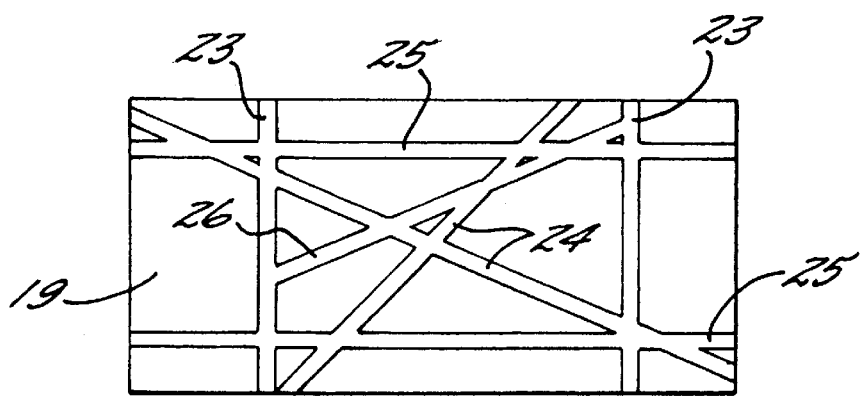
FIG. 13 depicts a flexible thermostabilized plate to be applied to the mandrel core.

The fabrication of the load-bearing structure can be executed upon a structurally modified mandrel. It houses a core 17 and covering 18 made of flexible thermostabilized flat plates 19 mounted by means of radiating positioning rods 20 and bands 21 made of unidirectional filaments 22 of fibrous material, which are positioned in the grooves 23 for the girth strips 6. Thermostabilized flat plates are made with criss-crossing grooves 24,25 to be imbedded with helical and longitudinal strips 4, 5. Grooves 23 are used for the girth strips 6. Thermostabilization of the flat plates 19 ensures precise continuity of the grooves when plates are mounted upon the mandrel 17, (FIG. 10) as well as dimensional stability of the entire structure of the tubular load-bearing structure. In order to imbed the oblique transition strips 14 between the girth strips 6 in each layer 3, thermostabilized flat plates 19 feature oblique grooves 26, (FIGS. 12 and 13) designed to house additional oblique stiffening ribs 15 integrated with the girth stiffening ribs 10, (FIG. 4). Here, the grooves 26 intersect with grooves 24 and 25 used to imbed spiral and longitudinal strips (4,5).

Method of fabrication of the composite load-bearing structure vessel in the form of a cylindrical body.

Flat thermostabilized molds (not depicted in the drawings) are made of polyurethane with their surface complementary to the surface of the flat plates 19, and are used to cast preform from a rubber-like material which is cured according to specifications. As a result of thermostabilization of polyurethane molds, the cast plates meet the exact specifications and their thermostabilization in the polyurethane molds based on the curing properties of the rubber-like material provides for output of thermostabilized plates 19.

Fabrication of plates 19 using metal (for instance, steel) molds fails to ensure thermostability, because the linear thermal coefficient of expansion of steel molds along the horizontal plane is significantly higher than the same coefficient in similar polyurethane molds; moreover, when metal plates are used, in linking plates 19 to the core 17 which form the skin 18, the respective helical, longitudinal, and girth grooves 24,25,26 do not match precisely.

Figure 14:
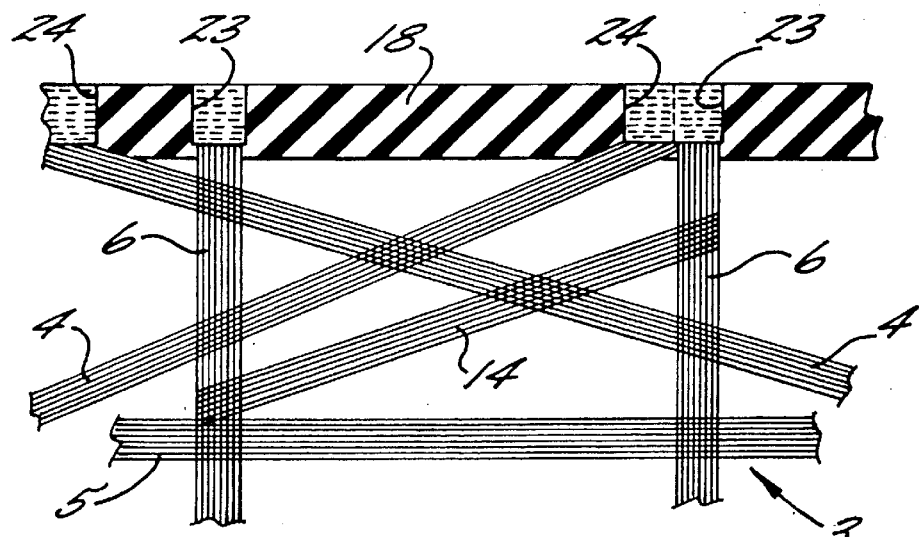
FIG. 14 is a flow diagram of the winding of the frame.

Thermostabilized flat plates 19 are secured to the core by means of radiating positioning rods 20 and bands 21 (FIG. 10) of unidirectional filaments 22 of fibrous material positioned in the girth grooves 23. Then, a sealing layer is applied to the entire surface of the covering 18, such as nonadhesive thermoplastic lamination or lubricant such as cyathium; then, according to the flow diagram (FIG. 14), strips 5,6,7 are wound upon the rotating mandrel in layers 3 of various patterns; for example, first, the girth strips 6 are wound forming oblique ribs 14; then, longitudinal strips 5 and helical strips 4 are wound. The grid frame is wound until the grooves 23, 24, 25 are filled completely. Then, radiating rods 20 are removed and strips of unidirectional filaments are wound around the grid forming an external protective cover. The mandrel with the wound preform is placed in a chamber to cure the polymer binder used to impregnate all the layers of the grid frame 1 and the covering 2. After the preform hardens, the core 17 is removed and the flexible flat plates 19 are stripped away; here, the bands 21 of unidirectional filaments 22 remain in the grid frame 1; their volume is insignificant. The tubular structure is machine-finished and is ready for assembly.

Prototypes of the load-bearing structure fabricated using the new technology and new and improved mandrel have been tested with positive results.

The novel technical solution for the fabrication of the tubular load-bearing structure made of composites makes for performance products practicable in manufacturing. Consequently, the novel techniques comply with the criterion of "technologically useful" and their implementation and use should be granted exclusive patent-protected rights.

We claim:

1. A composite tubular load-bearing structure in the form of a cylindrical body having a wall, the tubular structure comprising a lattice-type structural grid defined by longitudinal stiffening ribs which are spaced apart in a girth direction, helical stiffening ribs which are spaced apart in a helical direction, and girth stiffening ribs which are spaced apart in a longitudinal direction of the tubular structure, the stiffening ribs intersecting one another to define the lattice-type structural grid, the stiffening ribs being formed of a system of layered interlaced helical, longitudinal, and girth strips running axially within the wall, and the tubular structure further including an external protective cover; wherein the helical, longitudinal and girth strips are constructed of unidirectional filaments which intersect at nodes and which form the stiffening ribs between the nodes of intersections, and wherein the structural grid includes contiguous oblique transition strips which form additional oblique stiffening ribs running axially in the wall so as to intersect the stiffening ribs formed by the helical, longitudinal, and girth strips.

2. The tubular structure of claim 1 wherein the additional oblique stiffening ribs are located between the stiffening ribs formed by the girth strips and form a continuous helical pattern.

3. The tubular structure of claim 1 wherein the additional oblique stiffening ribs are located between the stiffening ribs formed by the girth strips and are situated in a zone along the generatrix of the tubular structure and are spaced by the length of each additional oblique stiffening rib.

4. The tubular structure of claim 1 wherein the additional oblique stiffening ribs are located between the stiffening ribs formed by the girth strips and are evenly spaced relative to each other in a girth direction.

* * * * *

UNITED STATES PATENT AND TRADEMARK OFFICE
CERTIFICATE OF CORRECTION

PATENT NO. : 5,871,117

DATED : February 16, 1999

INVENTOR(S) : Protasov et al.

It is certified that error appears in the above-identified patent and that said Letters Patent is hereby corrected as shown below:

Title page, item [73], second assignee, "Crismb-Cat" should read --Aktsionernoe Obschestvo Centr Perspektivnykh Razrabotok Aktsionernogo Obschestva Centralny Nauchno Issledovatelsky Institut Specialnogo Mashinostroenia--.

Signed and Sealed this

Fourth Day of January, 2000

Attest:

*Attesting Officer*

*Acting Commissioner of Patents and Trademarks*